United States Patent [19]

Hofmeister et al.

[11] 3,708,618

[45] Jan. 2, 1973

[54] MODULAR TELEVISION RECEIVER

[75] Inventors: Richard J. Hofmeister, Arlington Heights; Thomas R. Steele, Lombard; Frederick J. Goetz, Arlington Heights, all of Ill.

[73] Assignee: Motorola, Inc., Franklin Park, Ill.

[22] Filed: Jan. 22, 1971

[21] Appl. No.: 109,023

Related U.S. Application Data

[63] Continuation of Ser. No. 730,511, May 20, 1968, abandoned.

[52] U.S. Cl. ..............178/7.9, 178/7.8, 317/101 CB, 336/67

[51] Int. Cl. ..............................................H04n 5/64

[58] Field of Search .....317/101 C, 101 DH, 101 CB; 178/7.8, 7.9; 336/65, 67, 68

[56] References Cited

UNITED STATES PATENTS

| | | | |
|---|---|---|---|
| 2,994,807 | 8/1961 | Devine | 317/101 CB |
| 2,898,585 | 8/1959 | Bauman | 317/101 C |
| 3,048,747 | 8/1962 | Errichiello | 317/101 CB |
| 2,691,724 | 10/1954 | Hoffman | 178/7.9 |
| 2,888,308 | 5/1959 | Devine | 317/101 CB |
| 2,752,413 | 6/1956 | Junkins | 178/7.9 |

*Primary Examiner*—Robert L. Griffin
*Assistant Examiner*—Joseph A. Orsino, Jr.
*Attorney*—Meuller, Aichele and Rauner

[57] ABSTRACT

The electrical components of a television receiver are assembled in a plurality of modules. Each module is coupled into the set by means of connectors so that it may be easily removed and replaced if required. Substantially all of the modules are assembled in a single chassis in the form of a drawer which can be moved to a forward position extending outside of the front of the television cabinet for easy access to each module.

5 Claims, 16 Drawing Figures

INVENTORS
FREDERICK J. GOETZ
RICHARD J. HOFMEISTER
THOMAS R. STEELE

BY Mueller, Aichele and Rauner
ATTORNEYS.

INVENTORS
FREDERICK J. GOETZ
RICHARD J. HOFMEISTER
THOMAS R. STEELE
BY Mueller, Aichele and Rauner
ATTORNEYS.

INVENTORS.
FREDERICK J. GOETZ
RICHARD J. HOFMEISTER
THOMAS R. STEELE

BY Mueller, Aichele and Rauner
ATTORNEYS.

INVENTORS.
FREDERICK J. GOETZ
RICHARD J. HOFMEISTER
THOMAS R. STEELE

BY Mueller, Aichele and Rauner
ATTORNEYS.

INVENTORS.
FREDERICK J. GOETZ
RICHARD J. HOFMEISTER
THOMAS R. STEELE
BY Mueller, Aichele and Rauner
ATTORNEYS.

MODULAR TELEVISION RECEIVER

This application is a continuation of Ser. No. 730,511 filed May 20, 1968 now abandoned.

BACKGROUND OF THE INVENTION

As modern television receivers become more complex the problem of repairing the receiver becomes more difficult. As the number of components used in the television receiver increases the susceptibility to breakdown increases and it becomes more difficult to replace defective components as they are more closely spaced. The problem has become even more complicated with the increasing number of color television receivers in use. A color television receiver has a larger number of circuits of a higher degree of complexity than the black and white receiver and further a more highly trained serviceman is required to properly service the color television receiver.

Fortunately for the service problem to date, most failures occur in the vacuum tubes used in the television receivers. A faulty or inoperative vacuum tube is relatively easy to find and replace. However, where the television receiver malfunction is caused by the failure of other components, such as resistors, capacitors or inductors, it is harder to isolate the defective component and a higher degree of skill on the part of the serviceman is required.

Even with the great majority of the color television receiver malfunctions being of the "easy to find and repair" type proper servicing of color sets has been difficult to obtain due to the shortage of trained serviceman.

At the present time advances in the state of the semiconductor art have led to the increasing use of transistors in color television receivers. The receiver described in this application has only two tubes, the picture tube and the high voltage rectifier tube, all the other active components in the receiver being semiconductors.

One important characteristic of a semiconductor device is its extreme reliability in comparison with the vacuum tube. The number of transistor and integrated circuit failures in the television receiver will be very low in comparison with the failures of other components, the reverse of what is true in present day color television receivers. Thus most failures in future television receivers will be of the hard to service type and will require more highly qualified servicemen.

The primary symptoms of a television receiver malfunction are shown on the picture tube of the television receiver while the components causing the malfunction are located within the cabinet. Also many adjustments to the receiver require the serviceman to observe the screen. Thus the serviceman must use unsatisfactory mirror arrangements to remove the electronic chassis from the cabinet, usually a very difficult task. Further many components are "buried" in a maze of circuitry and other components so that they are difficult to remove and replace without damage to other components in the receiver.

Repairing a modern color television receiver often requires that the receiver be removed from the home and carried to a repair shop where it may remain for many weeks. This is an expensive undertaking since most receivers are bulky and heavy enough to require at least two persons to carry them. Further, two trips must be made to the home, one to pick up the receiver and one to deliver it. For these reasons, the cost of maintaining the color television receiver in operating condition often exceeds the initial cost of the receiver and is an important factor in determining whether a receiver will be purchased.

SUMMARY

Therefore, the object of this invention is to provide a transistorized color television receiver in which the main electronic chassis is easily accessible for maintenance and adjustment.

Another object of this invention is to provide a transistorized color television receiver in which the main electronic chassis can be serviced from the front of the receiver.

Another object of this invention is to provide transistorized color television receiver which can be easily serviced in the home.

Another object of this invention is to provide a transistorized color television receiver which can be serviced and maintained by a relatively unskilled serviceman.

Another object of this invention is to provide a transistorized color television receiver in which the electronic circuits are divided into a plurality of modules with the modules easily removable for service and maintenance.

In practicing this invention a transistorized color television receiver is provided which includes a picture tube and a main electronic chassis contained within a cabinet. The cabinet has two adjacent openings in the front, with the picture tube mounted in one opening and the main electronic chassis positioned in the other opening. The main electronic chassis is slidably mounted within the cabinet so that it may be withdrawn through the second opening, in the same manner as a drawer, to expose the electronic circuitry therein for maintenance and adjustment from the front of the television receiver without removal of the rear closure panel. The main electronic chassis includes a loudspeaker mounted on the front of the electronic chassis control panel with the electronic chassis having substantially the same width as the speaker and substantially the same height as the picture tube.

The television receiver also includes a wiring harness including a plurality of wires interconnecting the electronic chassis and picture tube within the cabinet. A plurality of connectors are positioned on the main electronic chassis and are interconnected by the wires within the wiring harness. A plurality of electronic modules are positioned within the electronic chassis with each of the modules having at least one connector thereon. The connectors on the electronic modules care placed so as to mate with the connectors mounted on the electronic chassis for interconnection between the electronic modules and the picture tube. By this means the various electronic modules can be removed by unplugging the connectors and without requiring soldering or unsoldering of any wires in the set.

A portion of the electronic modules are pivotally supported on the chassis so that they may be swung to one side to expose other electronic modules without removal from the electronic chassis. The connectors mounted on the electronic chassis have openings in the electronic chassis positioned adjacent the connectors to provide an area for soldering the grounding wires to the chassis from the connector. The opening also prevents contact between the soldering iron and the connectors to prevent damage to the connectors during the soldering operation. A power line interlock is provided which disconnects power to the electronic chassis when the electronic chassis is withdrawn from the cabinet for maintenance. A connector is provided on the electronic chassis, accessible from the front of the cabinet with the chassis in its forward position, to provide means for providing power to the electronic chassis with the chassis in its forward position.

The electronic modules include a high voltage chassis, a power supply chassis and a plurality of printed wiring boards with components mounted thereon. The printed wiring boards are so positioned within the electronic chassis that they are easily removable and are accessible for measurements therein without removal from the chassis. The tuners used within the television receiver are mounted on brackets connected to the electronic chassis for easy removal of the tuner from the television set without disassembly of the other components of the electronic chassis.

The invention is illustrated in the drawings wherein.

DESCRIPTION OF THE INVENTION

Figure 1:
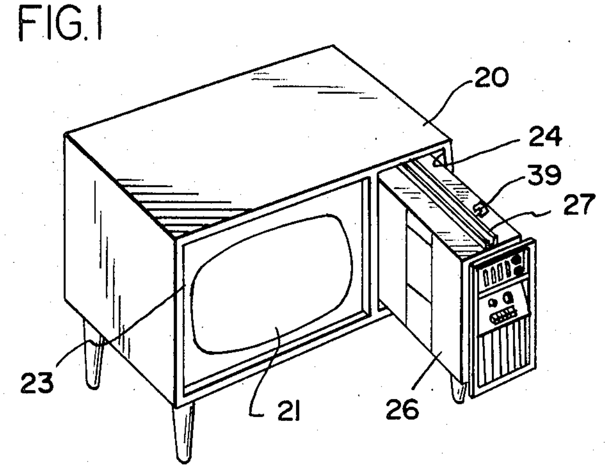
FIGS. 1 and 2 are front views of the television receiver with the main electronic chassis in the forward position.
Figures 2, 3, 4:
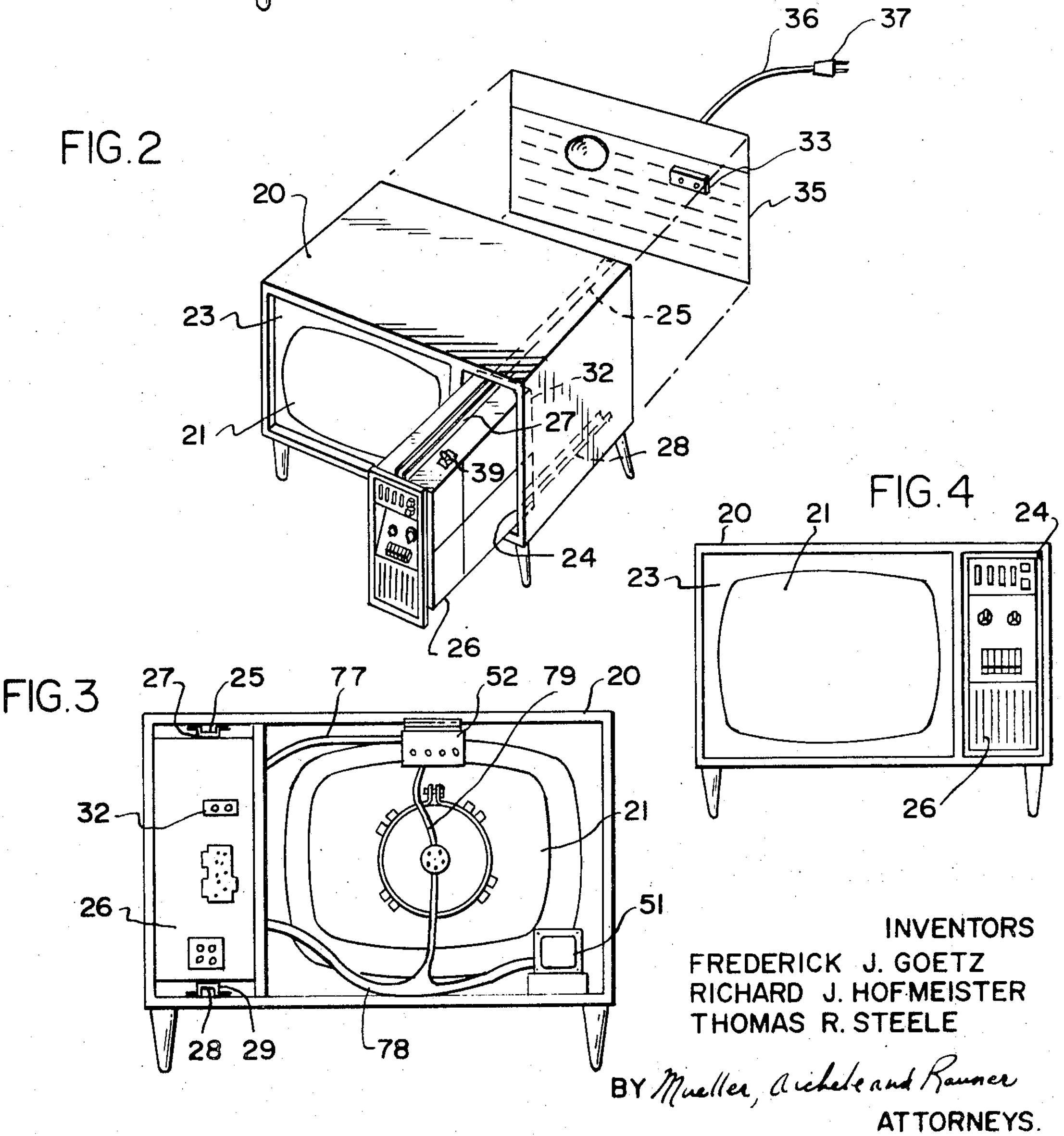
FIG. 3 is a rear view of the television receiver.
FIG. 4 is a front view of the television receiver with the main electronic chassis in its normal operating position.

Referring to FIGS. 1, 2, 3 and 4, there is shown a television cabinet 20 incorporating the features of this invention. Cabinet 20 includes a cathode ray picture tube 21 which is positioned in one opening 23 in the front of cabinet 20. In a second cabinet opening 24 there is positioned a main electronic chassis 26. As shown in FIG. 4, during normal operation of the television receiver the electronic chassis 26 is positioned entirely within cabinet 20 and in this position is operative to control the television receiver for proper reception of television programs.

The main electronic chassis 26 has slides 27 and 29 mounted on the top and bottom thereof. Slides 25 and 28 are mounted on the top and bottom of the cabinet and engage slides 27 and 29 respectively to permit chassis 26 to be withdrawn through the second cabinet opening to a forward position as shown in FIGS. 1 and 2. With the chassis in the forward position most of the electronic circuitry of the television receiver is available for service and repair from the front of the television receiver. A catch on slide 29 acts to release the chassis 26 to permit it to be withdrawn from the cabinet.

A connector 32, mounted on the rear of the main electronic chassis 26 mates with connector 33 mounted on the rear closure panel 35 to provide power. A line cord 36 connected to connector 33 has plug 37 adapted to be connected to a wall receptacle for providing power to the television receiver. With main electronic chassis 26 positioned within cabinet 20 in its normal operating position, power is supplied through line cord 36 and connectors 33 and 32 to the main electronic chassis. A wiring harness within the main electronic chassis and the television cabinet distributes power throughout the television receiver as required.

With the main electronic chassis withdrawn to its forward testing and servicing position, shown in FIGS. 1 and 2, connectors 32 and 33 are disconnected so that they act as an electrical interlock removing power from the television receiver. This safety feature acts to prevent injury to to personnel when the chassis is withdrawn for removal or servicing.

Figure 5:
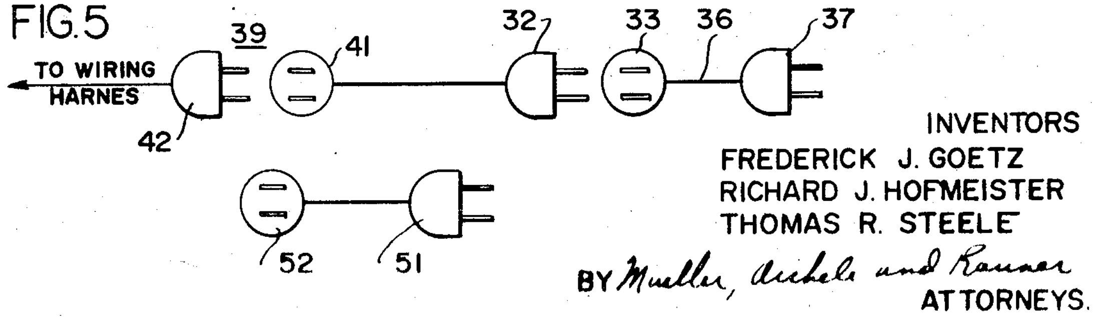
FIG. 5 is a schematic illustrating the power interlock of the receiver.
Figure 6:
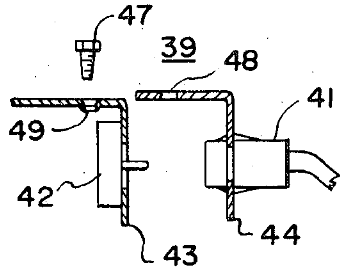
FIG. 6 is a cross-sectional view of the service interlock of the receiver.

Referring to FIGS. 5 and 6, there is shown a schematic and detailed drawing of the means by which the interlock can be bypassed. The connector assembly 39 of FIG. 6 is positioned at an easily accessible location of main chassis 26 as shown in FIG. 2. Connector 41 is mounted on a bracket 44 while connector 42 is mounted on a portion of the main chassis 43. With connector 41 inserted into connector 42, connector assembly 39 is secured with screw 47 inserted in holes 48 and 49. With connector 41 removed from connector 42 the line voltage is removed from the television set. Line voltage can be restored to the set by plugging in a "cheater" cord having connector 52 which mates with connector 42. Connector 51 may be inserted in a wall socket to receive the line power supply. Since connector 41 is not inserted in connector 42, an accidental connection of connector 37 to the line power supply will not cause the line power supply to be connected to the set in a manner which will cause damage to the set.

The television receiver of this invention is divided into a plurality of electronic modules. Shown in FIG. 3 are the power supply module 51, a rear view of picture tube 21, the main electronic chassis 26 and the video drive unit 52. The main electronic chassis 26 also contains a plurality of individual electronic modules.

Figure 7:
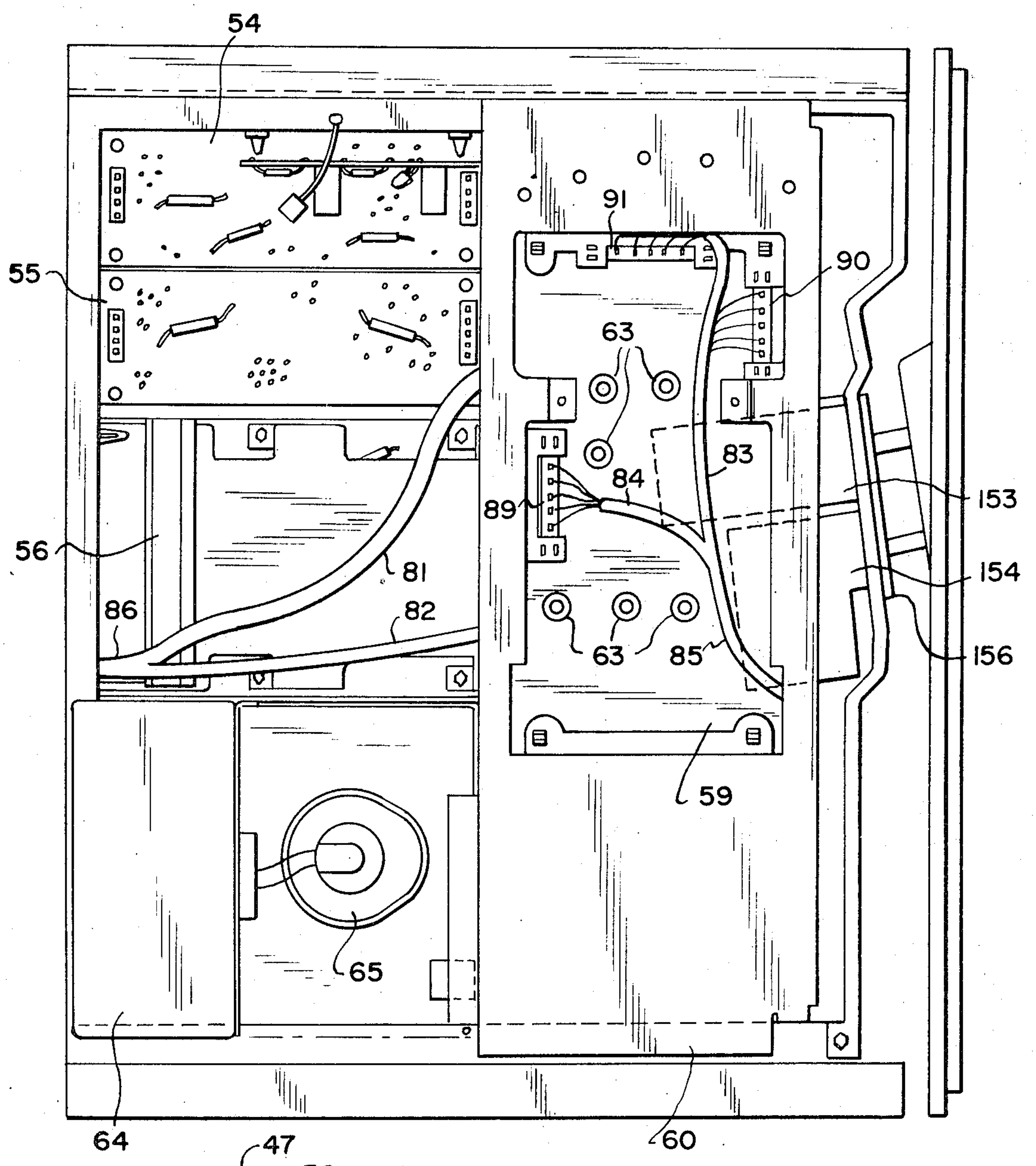
FIG. 7 is a view of the left side of the main electronic chassis.
Figure 8:
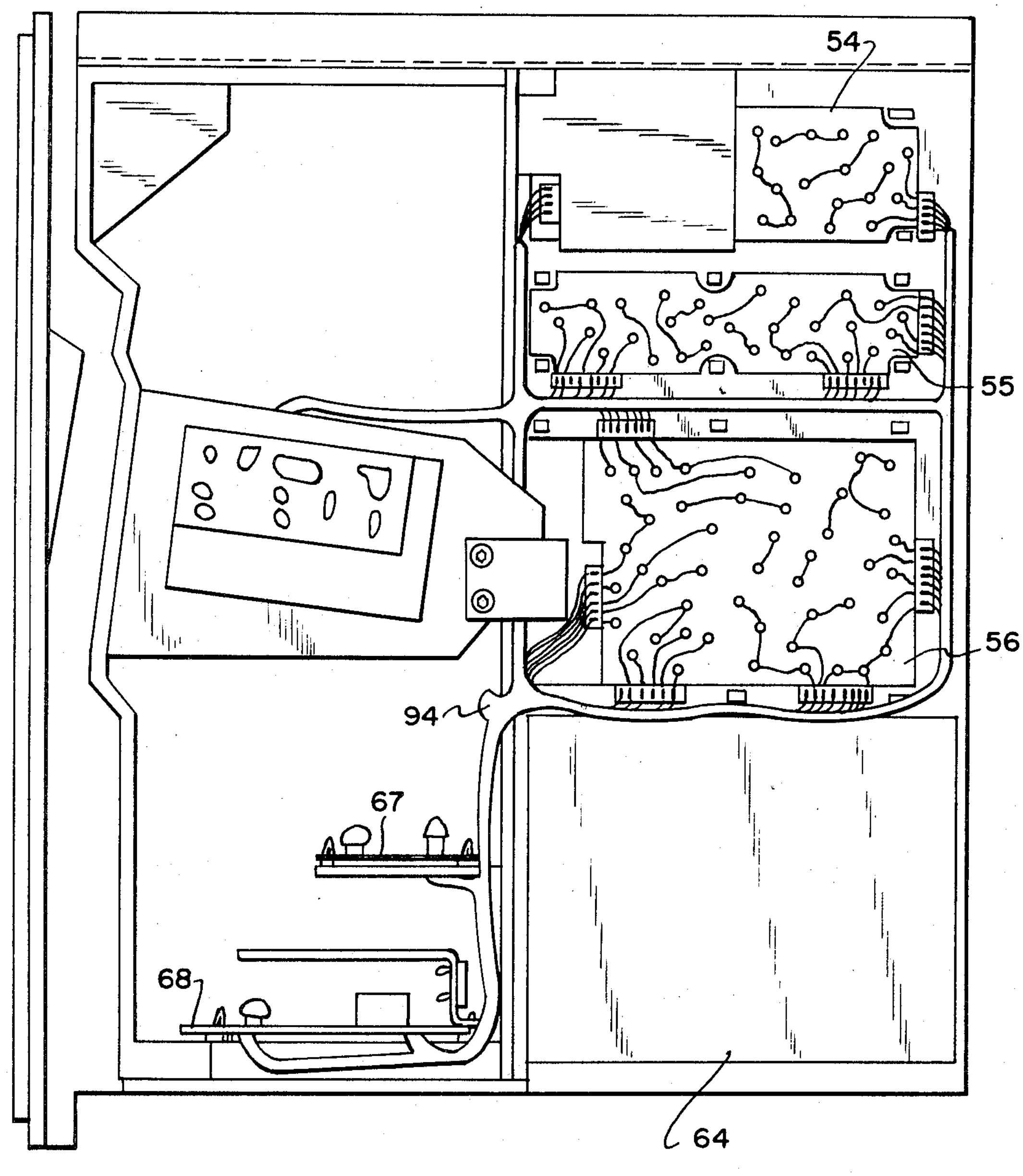
FIG. 8 is a view of the right side of the main electronic chassis.

FIG. 7 is a view of the left side of main chassis 26 and FIG. 8 is a view of the right side of main chassis 26. FIGS. 7 and 8 show the location of a number of the electronic modules which are used in this television receiver. In main electronic chassis 26 there is the video IF module 54, the video amplifier module 55 and the chroma module 56. The convergence chassis 59 is mounted on a panel 60 which is pivoted so that it may be swung out to reveal the components mounted behind the convergence chassis. Convergence chassis 59 has a plurality of convergence adjustment controls 63 mounted thereon so that the television receiver can be adjusted for convergence from the front of the set. Convergence chassis 59 is operative when it is in its open position.

The high voltage rectifier module 64 includes a pivoted door (not shown) which can be opened to gain access to the high voltage rectifier tube 65 shown in FIG. 7. High voltage rectifier tube 65 is the only tube in the television receiver except for the picture tube.

Figure 9:
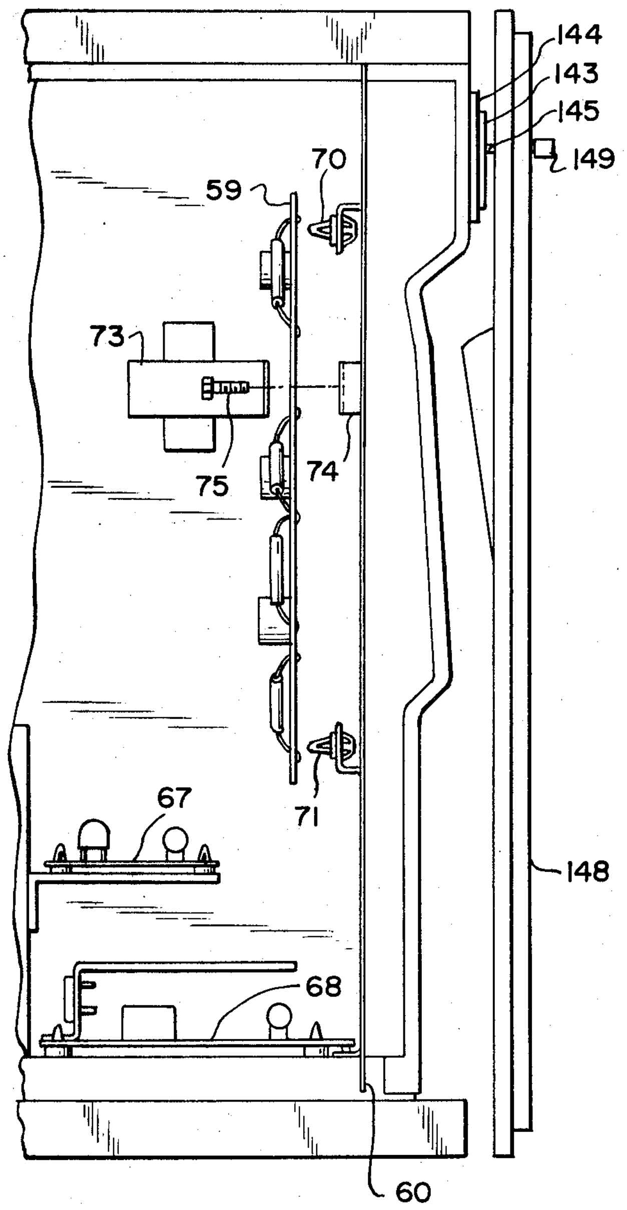
FIG. 9 is a view of a portion of the left side of the main electronic chassis.

Additional electronic chassis are the pincushion corrector module 67 and the horizontal module 68 shown in FIGS. 8 and 9. FIG. 9 also shows the mounting structure of the convergence module 59 which plugs into fasteners 70 and 71. Wherever possible, the electronic modules are fastened into the set by this means so that they may be removed without the use of tools. However, in convergence chassis 59 a transformer 73 is rigidly attached to the metal frame bracket 74 with screw 75. This is necessary to support the relatively heavy mass of the transformer. Boards are also connected to the main chassis frame by screws where it is necessary to provide grounding from the printed wiring board to the main chassis. A more detailed description of the mounting of the printed wiring boards will be found in a subsequent portion of the specification.

As shown in FIGS. 8 and 9, wherever possible the main electronic chassis is cut away to permit access to both sides of the printed wiring boards. This is shown by modules 54, 55 and 56.

Referring again to FIG. 3, it can be seen that the main electronic chassis 26, the power supply chassis 51, tube 21 and drive module 52 are interconnected by wiring harnesses 77, 78 and 79. While the reference numerals refer to three separate wire harnesses, a harness can be designed so that substantially all of the wiring is contained in a single harness which can be prepared in advance and snapped into the set to provide wiring for interconnecting all of the modules.

Referring to FIG. 7 there can be seen a continuation of the harness wiring where harnesses 81, 82, 83 and 84 are routed to various portions of the main electronic chassis. It can be seen that harnesses 83 and 84 join to form a single harness 85 while harnesses 81 and 82 join to form a single harness 86. The various harnesses within the set terminate in connectors which are fastened to the chassis. The chassis is so designed that the connectors can be assembled to the harness before assembly into the set and merely snapped into place when the television receiver is being built. For example, the wiring of harness 84 is shown connected to connector 89 and the wiring of harness 83 is shown connected to connectors 90 and 91 in FIG. 7.

Referring to FIG. 8 another view of the wiring harness is shown. It should be understood that the wiring harness shown in FIG. 8 is merely a continuation of the wiring harness shown in FIG. 7 with all of the various numbered harnesses being merely branches of the wiring harness. For example, the portion of the wiring harness designated by reference numeral 94 continues across the main electronic chassis and becomes the wiring harness 81 shown in FIG. 7. The wiring harness shown in FIG. 8 connects to a plurality of connectors with each of the printed wiring boards having one or more wiring harness connectors associated with that board.

Figures 10, 11, 12, 13:
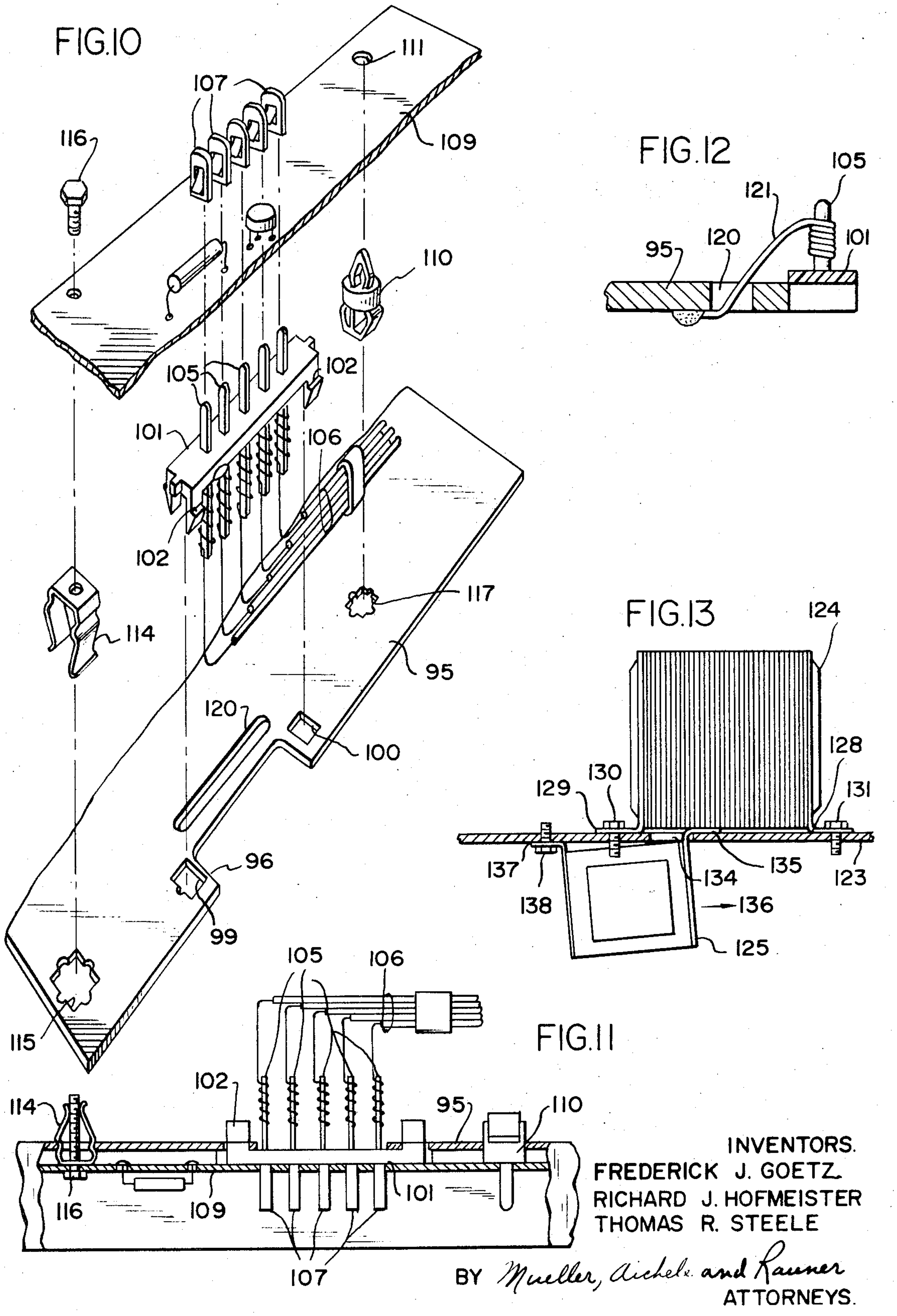
FIGS. 10 and 11 are views showing the harness and chassis connections.
FIG. 12 is a cross-sectional view of a ground wire connection to the chassis.
FIG. 13 is a cross-sectional view showing transformer mounting.

In FIGS. 10 and 11 there are shown views of the circuit board connector structure and harness structure of the television receiver of this application. A portion of the main electronic chassis 95 has an opening therein 96 with two holes 99 and 100 adjacent opening 96. A connector 101 having snap fastening 102 at each end thereof is positioned in slot 96 with snap fastenings 102 inserted in holes 99 and 100. Since one edge of chassis 95 is opened to form opening 96 connector 101 can be positioned in opening 96 with the wires in cable harness 106 connected to connector 101.

Connector 101 has a plurality of pins 105 extending therethrough with individual wires in the cable harness 106 connected to individual ones of pins 105. Pins 105 mate with connectors 107 on printed wiring board 109 to establish electrical connection between the printed wiring board and the wires in connector 101. Printed wiring board 109 is held in place on chassis 95 by means of pin 110 inserted in opening 117 of the chassis 95. Pin 110 extends through hole 111 in printed wiring board 109 with pin 110 being shaped to expand against the sides of hole 111 to firmly hold printed wiring board 109 in place. Where it is necessary to establish a good ground connection between chassis 95 and the printed wiring board 109, a special metallic fastener 114, inserted in opening 115, may be used. Pin 114 is adapted to receive a screw 116 which is inserted through hole 117 in printed wiring board 109 to fasten printed wiring board 109 to chassis 95 securely.

Referring to FIGS. 10 and 12, an opening 120 is shown in chassis 95 adjacent the opening 96 where it is necessary to solder a wire 121 from one of the pins 105 to chassis 95 at a point adjacent opening 120. A soldering iron inserted in opening 120 acts to heat up a small portion of the chassis adjacent the opening to the proper soldering temperature more rapidly than would be possible if the soldering iron were applied directly to the area of the chassis to which a wire 121 is to be soldered. Slot 120 also acts to prevent the soldering iron from sliding sideways across chassis 95 to contact connector 101 and damaging it.

Referring to FIG. 13 there is shown a cross-sectional view of a portion of the chassis of power supply 51 shown in FIG. 3. Power supply 51 includes a flat metal surface 123 upon which components such as transformers 124 and 125 are mounted. Transformer 124 has brackets 128 and 129 which are fastened to chassis 123 by screws 130 and 131.

Transformer 124 illustrates the normal method by which large components are mounted on an electronic chassis. However, it is often necessary to put a large number of electronic components on a single chassis and therefore components are mounted on both sides of the chassis. Thus transformer 125 is mounted underneath transformer 124. If transformer 125 were mounted in the normal manner a pair of screws such as screws 130 and 131 of transformer 124 would be used to fasten transformer 125 to the chassis. If this were done it would be necessary to provide space underneath transformer 124 for the mounting screws to protrude through the chassis or to use a special type of mounting screw. Alternatively transformer 125 could be mounted so that brackets 135 and 137 clear transformer 124 which would restrict the mounting space available for transformer 125.

In order to overcome the above difficulties an opening 134 is provided in chassis 123. Mounting bracket 135 for transformer 125 is inserted through the opening and transformer 125 is moved in the direction of arrow 136 to the position shown in FIG. 13. The other mounting bracket 137 for transformer 125 is fastened to chassis 123 with screw 138. By this means only one mounting screw is required to hold transformer 125 is place with bracket 135 of transformer 125 being held in position by the pressure of transformer 125. In order to remove transformer 125 it is only necessary to loosen the mounting screws for transformer 124 and to remove mounting screw 138. This provides a simple and inexpensive method of mounting components on opposite sides of the same chassis.

Figure 14:
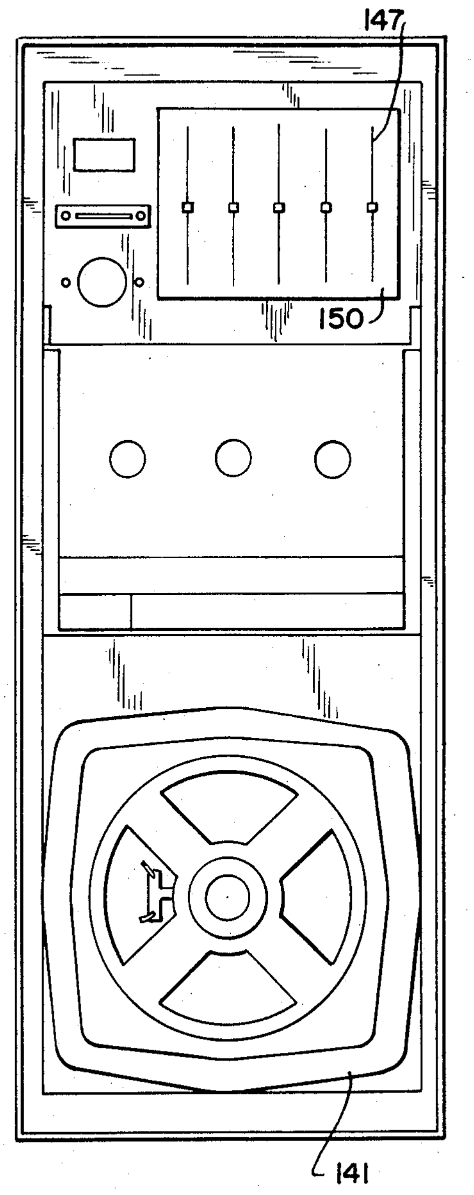
FIG. 14 is a view of the back side of the control panel.

Referring to FIG. 14 there is shown a rear view of the front mounting panel of the receiver. A speaker 141 is mounted to the front panel and extends substantially across the full width of the front panel. Thus the front panel and the main electronic chassis are of the same width as required for the speaker.

Referring to FIGS. 9 and 14, a plurality of slide pots 143 are mounted on a bracket 144 which is attached to the main electronic chassis. Each slide pot has an arm 145 extending through a slot 147 in the control panel 148. Arm 145 is moved up and down by a knob 149 to control the operation of the television receiver.

Since each of the slide pot arms are set in fixed positions the greater part of the slot through which they extend is unoccupied by any material and it is therefore possible to look through the slots back into the main television chassis. This presents an unsightly appearance and is eliminated by the application of a rubber closure sheet 150 having a plurality of slots cut therein to match the plurality of openings in the electronic control panel. The slots in the rubber closure sheet are narrower than the slide pot arms and are forced open by the slide pot arm as the arm moves up and down. The rubber closure sheet acts to close off the opening so that it is not possible to look through the slots back into the electric chassis.

Referring to FIG. 9, the slide pots are mounted on a bracket 144 which is easily removable so that the slide pots can be removed as a single unit for any required maintenance work thereon. In FIG. 7 tuner chassis 153 and 154 are also mounted on a bracket 156 so that they may also be easily removed if work is required. By use of mounting brackets work the main chassis panel it is possible to remove these components to make them more accessible for any maintenance work required.

Figure 15:
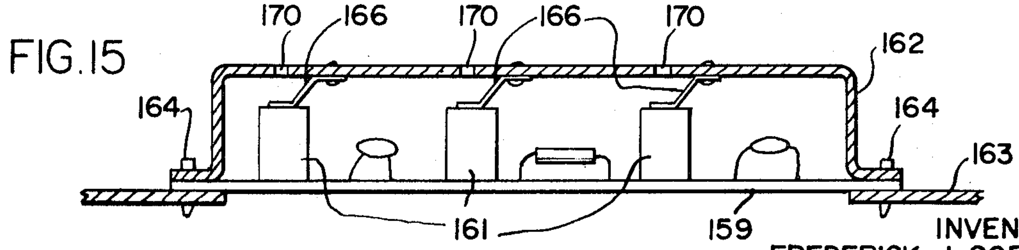
FIGS. 15 and 16 are views showing construction of the chroma module ground plate.

In FIG. 15 there is shown a side view of the chroma board 159 of the television receiver. Chroma board 159 has a large number of components mounted thereon including a plurality of shield cans 161 used to shield components mounted inside the cans. Shield cans 161 are normally grounded where they are inserted in the printed wiring board, however, it has been found that it is also necessary to ground the cans at the top in order to provide proper shielding. This is accomplished by means of a grounding plate 162 which is fastened to chassis 163 by screws 164 using grounding clip 114 shown in FIG. 10. Grounding plate 162 and screws 164 also serve to hold printed wiring board 159 in position.

Figure 16:
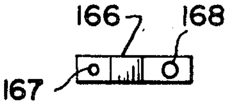

A plurality of flat springs 166 are fastened to grounding plate 162 by rivets or other fastening means and extend downwards and over the tops of the shield cans 161. When grounding plate 162 is fastened into position the flat springs 166 make firm contact against the tops of the shield cans 161 to provide grounding therefor. As shown in FIG. 16, flat spring 166 has a hole 167 through which suitable mounting means may be inserted to fasten spring 166 to the grounding plate 162. Flat spring 166 also has an opening therein 168 which is aligned opposite opening 170 in grounding plate 162. Openings 170 and 168 permit tools to be inserted through the grounding plate 162 and flat springs 166 into shield cans 161 for adjusting components positioned therein.

With the modular concept of the television receiver of this application it is expected that most of the required maintenance work could be done in the home and any defective modules repaired by replacing the entire module. Since many of the modules are held in place by guide pins it is only necessary to unplug the module and replace it. In some cases it may be necessary to remove a few mounting screws to remove the module.

If additional work is required which cannot be performed in the home, the entire main electronic chassis can be removed from the television receiver by unplugging the wiring harness and withdrawing the main chassis through the front opening of the television receiver. The weight and size of the main electronic chassis is such that it can be easily carried by a single repairman eliminating the expense of additional labor required to carry the entire television receiver. If the main chassis and control panel are removed from the set, a dummy panel of a decorative nature can be inserted in place of the missing panel to maintain a pleasing appearance for the television receiver.

We claim:

1. A television receiver including in combination:

a cabinet with a removable rear closure panel and a front panel having first and second adjacent openings therein with a picture tube mounted in said first opening;

a first electronic chassis positioned adjacent said picture tube and having a front portion with a control panel attached thereto, said first electronic chassis having an operating position with said control panel being positioned within said second opening whereby said control panel and said picture tube occupy the major portion of said front panel, said first electronic chassis being slidably mounted in said cabinet whereby said control panel and said first electronic chassis can be moved through said second opening to a forward position to expose said electronic chassis for work thereon without removing said rear closure panel;

wiring means including a wiring harness coupled to said first electronic chassis and movable therewith, whereby the television receiver is operable with said first electronic chassis in said forward position, said wiring harness extending throughout said first electronic chassis and having a plurality of wires therein;

a plurality of first connectors, each forming one-half of a pin and pin-receiving connector set, separately positioned in openings in said first electronic chassis with each first connector being electrically connected to particular ones of said plurality of wires;

a plurality of electronic modules at least some of which include printed wiring boards with electronic components mounted thereon positioned within said first electronic chassis with each of said modules having at least one second connector, forming the other half of a pin and pin-receiving connector set, mounted thereon for mating engagement with a predetermined one of said first connectors, said first and second connectors being positioned on said first electronic chassis and on said electronic modules so that each of said first connectors engages a separate one of said second connectors to permit removal of said electronic modules from said first electronic chassis without disconnecting any of said plurality of wires; said first electronic chassis including openings adjacent at least a portion of said printed wiring boards mounted thereon so that both sides of said printed wiring boards are accessible for maintenance with said first electronic chassis in said forward position;

means for pivotally mounting one of said plurality of electronic modules on said first electronic chassis so that said pivotally mounted module may be swung to an open position to provide access to others of said plurality of electronic modules, said pivotally mounted module further being operable in said open position;

power interlock means;

a first power line connected to the said power interlock means and adapted to receive electric power for operation of the receiver; and power line connector means connected to the wiring harness for connecting said power interlock means with said wiring harness with the first electronic chassis in said operating position so that a continuous electrical connection extends from said first power line through said power interlock and said power line connector means to said wiring harness, said power interlock means being responsive to movement of said first electronic chassis to said forward position to break said electrical connection between said power interlock means and said power line connector means, said power line connector means being positioned on said electronic chassis so that said power line connector means is exposed with said electronic chassis in said forward position to permit connection of a second power line thereto without removal of said rear closure panel to provide operating power to said wiring harness with said first electronic chassis in said forward position.

2. The television receiver of claim 1 wherein, said first electronic chassis includes a top rail and a bottom rail mounted on the top and bottom of said first electronic chassis respectively, said television cabinet having a bottom rail mounted at the bottom of said second opening and extending rearwards of said second opening and a top rail mounted at the top of said second opening and extending rearwards of said second opening, said top and bottom rails of said first electronic chassis engaging said top and bottom rails of said first electronic chassis whereby said first electronic chassis is slidably movable through said second opening between said operating and said forward positions.

3. The television receiver of claim 1 wherein, said first electronic chassis is made of metal and has a plurality of first openings therein for receiving said first connectors, said first electronic chassis further having at least one second opening therein positioned adjacent one of said plurality of first openings, said second opening providing means for soldering a grounding wire from said first connector adjacent thereto said first electronic chassis and to protect said first connector from excessive heat during said soldering operation.

4. The television receiver of claim 1 further including a second electronic chassis mounted in the cabinet behind said picture tube, said second electronic chassis including a mounting surface; first and second transformers mounted on said mounting surface of said second electronic chassis; and means for coupling said wiring harness further to said second electronic chassis and said picture tube.

5. The television receiver of claim 4 wherein said mounting surface of said second electronic chassis has first and second sides thereon, and wherein said first and second transformers each have a pair of mounting brackets; said first transformer having at least one screw securing each of said pair of mounting brackets thereon to said first side of said mounting surface, said mounting surface having an opening therein positioned under said first transformer, said second transformer being mounted on said second side of said mounting surface with one of said mounting brackets thereon inserted through said opening and held in place by said first transformer, the other of said mounting brackets of said second transformer being secured to said mounting surface by at least one screw.

* * * * *